US012615339B2

(12) United States Patent
Matsuo et al.

(10) Patent No.: US 12,615,339 B2
(45) Date of Patent: Apr. 28, 2026

(54) SHEET SUPPLY APPARATUS, IMAGE READING APPARATUS, AND RECORDING APPARATUS

(71) Applicant: CANON KABUSHIKI KAISHA, Tokyo (JP)

(72) Inventors: Kazuki Matsuo, Kanagawa (JP); Kuniaki Sato, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 199 days.

(21) Appl. No.: 18/347,350

(22) Filed: Jul. 5, 2023

(65) Prior Publication Data

US 2024/0022674 A1     Jan. 18, 2024

(30) Foreign Application Priority Data

Jul. 12, 2022     (JP) ................................. 2022-112007

(51) Int. Cl.
B65H 1/04          (2006.01)
H04N 1/00          (2006.01)

(52) U.S. Cl.
CPC ........... H04N 1/00615 (2013.01); B65H 1/04 (2013.01); B65H 2405/11425 (2013.01); H04N 2201/0081 (2013.01)

(58) Field of Classification Search
CPC .................... B65H 2403/411; B65H 2403/412
See application file for complete search history.

(56) References Cited

U.S. PATENT DOCUMENTS

| | | | | |
|---|---|---|---|---|
| 6,953,190 | B2 * | 10/2005 | Shin ......................... | B65H 3/06 |
| | | | | 271/157 |
| 7,780,162 | B2 * | 8/2010 | Kaneko .................. | B65H 31/20 |
| | | | | 74/462 |
| 8,844,925 | B1 * | 9/2014 | Chiu ........................ | B65H 1/04 |
| | | | | 271/240 |
| 9,058,020 | B2 * | 6/2015 | Rochat ................... | G04B 17/28 |

FOREIGN PATENT DOCUMENTS

| | | | | |
|---|---|---|---|---|
| JP | | 3871323 | B2 * | 1/2007 |
| JP | | 2010037031 | A | 2/2010 |

* cited by examiner

*Primary Examiner* — Howard J Sanders
(74) *Attorney, Agent, or Firm* — Canon U.S.A., Inc., IP Division

(57) ABSTRACT

A sheet supply apparatus includes a tray on which a sheet is to be placed, a regulation guide, a supporting body, and a rotating body. The regulation guide is disposed to the tray and regulates a side end of the sheet in a width direction when the sheet is conveyed in a conveyance direction. The supporting body includes a first teeth part and moves in the width direction together with the regulation guide. The rotating body includes a second teeth part engaging with the first teeth part of the supporting body and rotates with movement of the supporting body. The second teeth part is displaced to the rotating body based on a position of the regulation guide.

19 Claims, 17 Drawing Sheets

C–C

D–D

SHEET SUPPLY APPARATUS, IMAGE READING APPARATUS, AND RECORDING APPARATUS

BACKGROUND

Field

The present disclosure relates to a sheet supply apparatus supplying a sheet placed inside the sheet supply apparatus, and an image reading apparatus including the sheet supply apparatus.

Description of the Related Art

Sheet supply apparatuses for supplying a sheet placed on a placement part to a conveyance path and image reading apparatuses including the sheet supply apparatus include a regulation guide regulating a width direction of the sheet. The regulation guide can be moved by a rack part movable in a direction intersecting a sheet conveyance direction, and a pinion gear engaging rack teeth of the rack part. Japanese Patent Application Laid-Open No. 2010-37031 discusses a configuration in which pressing means is disposed to a rack part, and the rack part is pressed by the pressing means in a direction in which the rack part engages with the pinion gear. With this configuration, backlash between the rack part and the pinion gear is prevented, and the regulation guide is accurately positioned at a predetermined position corresponding to a size of the sheet.

There exist some conventional sheet supply apparatuses that include a plurality of rack arms and a plurality of pressing units provided in a rack that moves a regulation guide as part of a complicated structure. Further, due to the number of parts used, downsizing is difficult.

SUMMARY

The present disclosure is directed to a sheet supply apparatus including regulation guides that can be downsized.

According to an aspect of the present disclosure, a sheet supply apparatus includes a tray on which a sheet is to be placed, a regulation guide disposed to the tray and configured to regulate a side end of the sheet in a width direction when the sheet is conveyed in a conveyance direction, a supporting body including a first teeth part and configured to move in the width direction together with the regulation guide, and a rotating body including a second teeth part engaging with the first teeth part of the supporting body and configured to rotate with movement of the supporting body, wherein the second teeth part is configured to be displaced to the rotating body based on a position of the regulation guide.

Further features of the present disclosure will become apparent from the following description of exemplary embodiments with reference to the attached drawings.

DESCRIPTION OF THE EMBODIMENTS

Some exemplary embodiments of the present disclosure are described below with reference to drawings. Note that sizes, materials, shapes, relative dispositions, and the like of components described in the exemplary embodiments may be appropriately changed depending on a configuration of an apparatus to which the present disclosure is applied, various kinds of conditions, and the like, and do not intend to limit the scope of the present disclosure to the following exemplary embodiments.

\<Image Reading Apparatus\>

Figure 1:
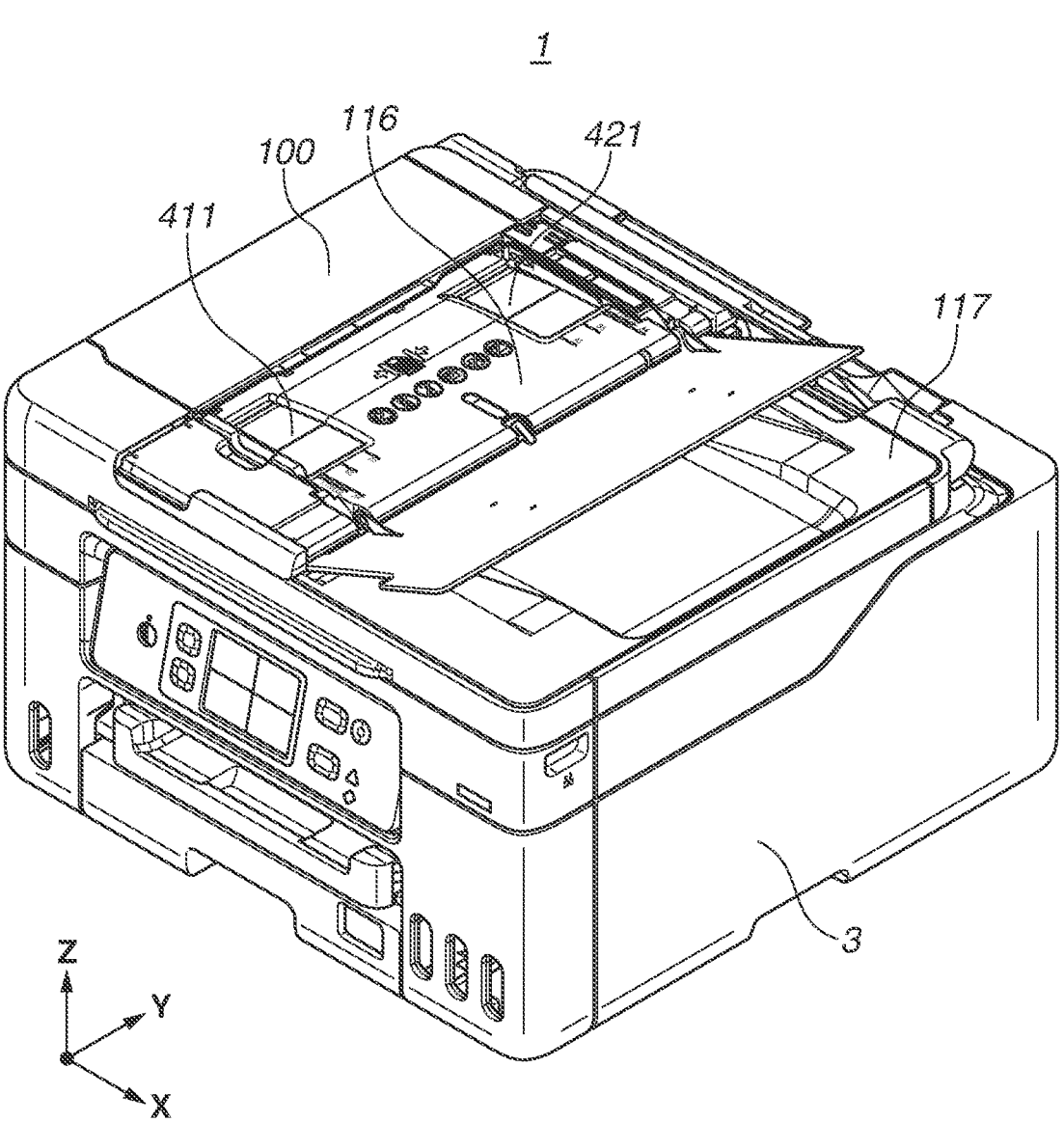
FIG. 1 is a diagram illustrating an entire configuration of an image reading apparatus.
Figure 2:
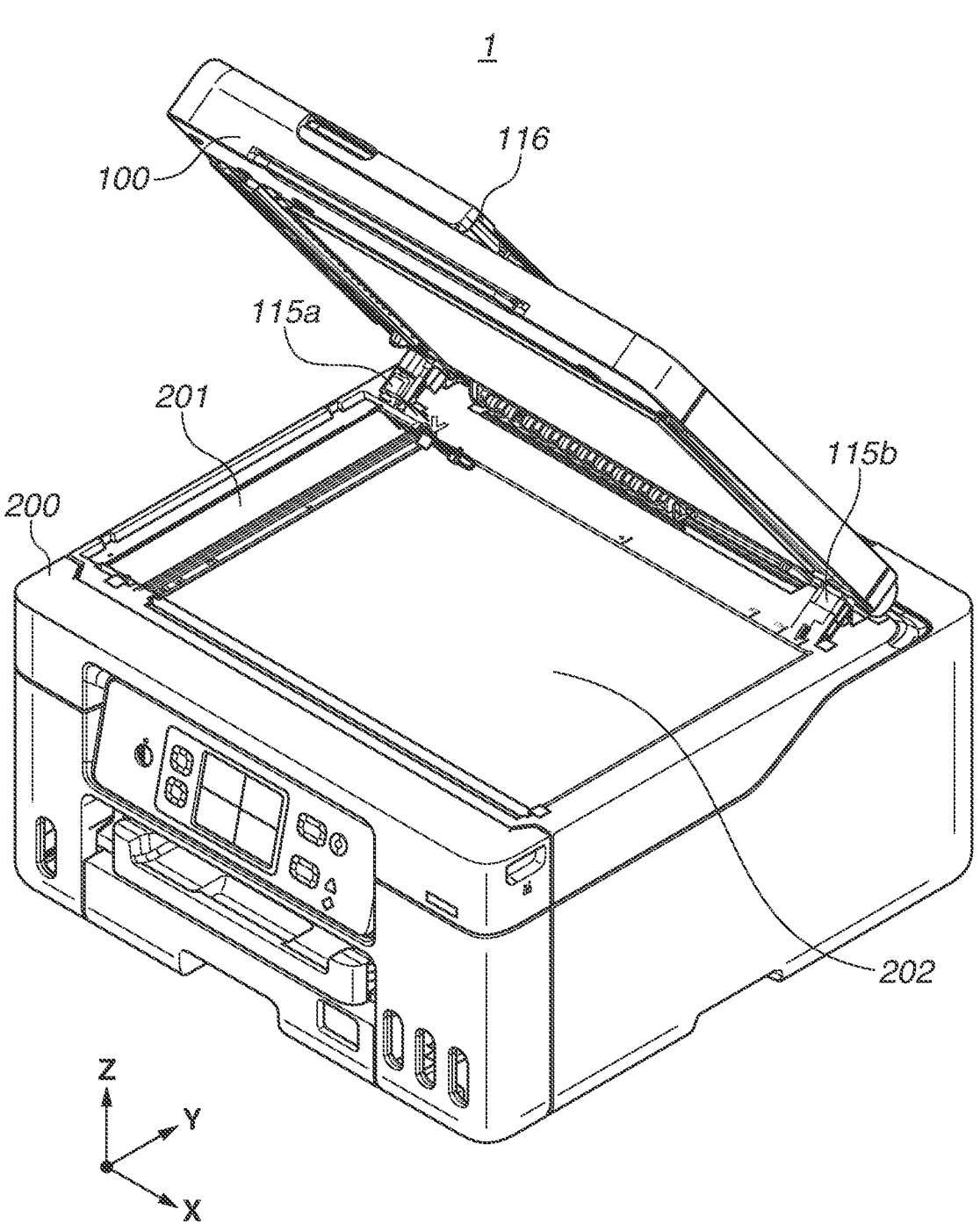
FIG. 2 is a diagram illustrating an entire configuration of the image reading apparatus with a sheet conveyance unit opened.
Figure 3:
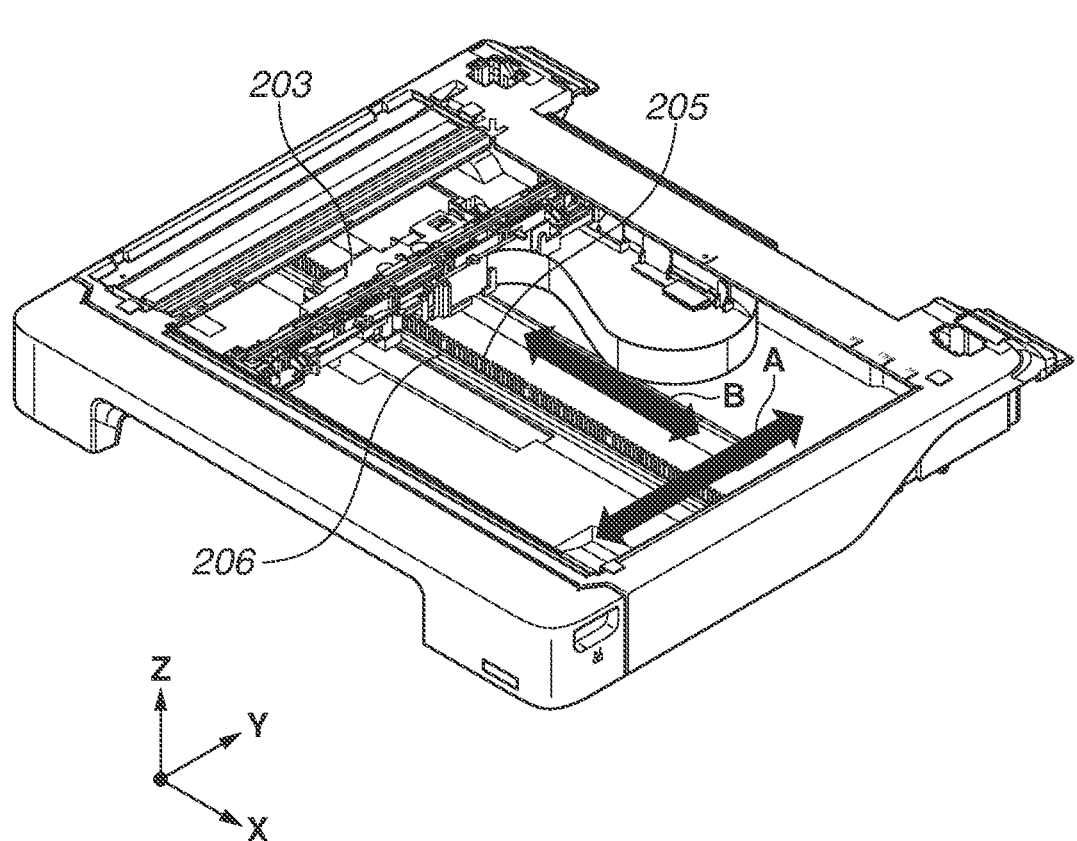
FIG. 3 is a perspective diagram illustrating a flatbed reading unit.
Figure 4:
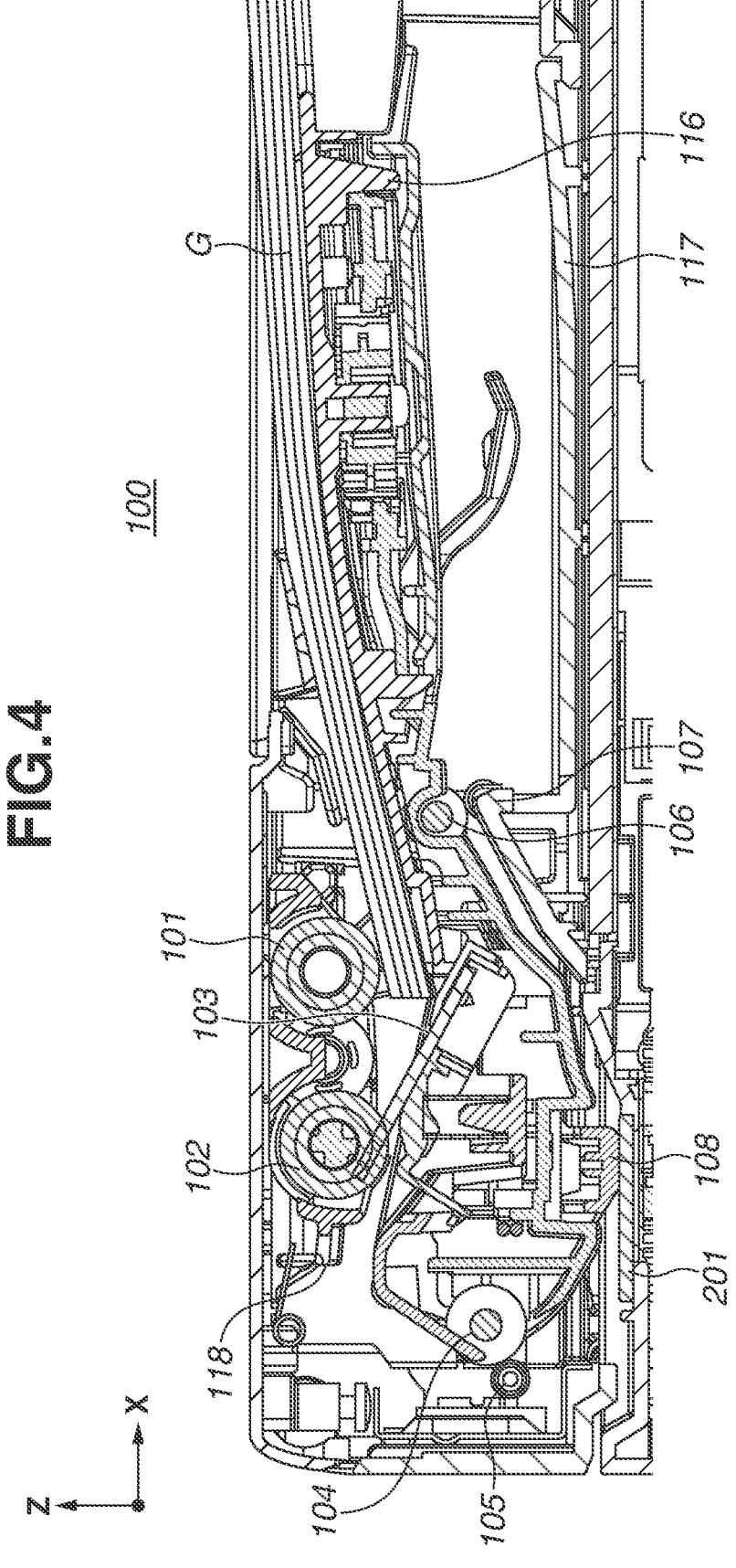
FIG. 4 is a cross-sectional diagram illustrating the sheet conveyance unit.

An image reading apparatus according to a first exemplary embodiment is described with reference to FIGS. 1 to 4. FIG. 1 is a diagram illustrating an entire configuration of an image reading apparatus 1. FIG. 2 is a diagram illustrating an entire configuration of the image reading apparatus 1 with a sheet conveyance unit 100 opened. FIG. 3 is a perspective diagram illustrating a flatbed reading unit 200. FIG. 4 is a cross-sectional diagram illustrating the sheet conveyance unit 100. An X direction is a width direction of the image reading apparatus 1, a Y direction is a depth direction, and a Z direction is a height direction. While, a description will be given of a case in which the present exemplary embodiment is applied to a sheet supply apparatus of the image reading apparatus including a recording unit, the exemplary embodiment is applicable to the other forms, for example, a sheet supply apparatus of an image reading apparatus including no recording unit, and a sheet supply apparatus of a recording apparatus including no reading unit.

The image reading apparatus 1 includes the flatbed reading unit 200, the sheet conveyance unit 100, and a recording unit 3 of an inkjet type. The sheet conveyance unit 100, which is an auto document feeder (ADF), is provided above the flatbed reading unit 200. The sheet conveyance unit 100 is openably connected to the image reading apparatus 1 by hinges 115a and 115b disposed at positions on the far side of the image reading apparatus 1. The flatbed reading unit 200 can read an image of a sheet conveyed by the sheet conveyance unit 100 or an image of a sheet placed on a transparent member 202. On a sheet, the recording unit 3 can record an image from an external personal computer (PC) and the image read by the flatbed reading unit 200.

The flatbed reading unit 200 includes a reading unit 203 including a line sensor that can read the image of the sheet. When the reading unit 203 performs scanning in a subscanning direction (arrow B direction) orthogonal to a main scanning direction (arrow A direction) of the line sensor, the image of the sheet placed on the transparent member 202 can be read. The reading unit 203 uses an equal-magnification optical system, and is called a contact image sensor (CIS). A driving force transmitted from a driving unit including a driving apparatus to a rack 205 moves the reading unit 203 in the sub-scanning direction along a guide rail 206.

The sheet conveyance unit 100 conveys a sheet on which an image has been recorded, to an ADF transparent member 201. The conveyed sheet is read by the reading unit 203 below the ADF transparent member 201. In the sheet conveyance unit 100, the driving force from the driving apparatus is transmitted to a pickup roller 101, a separation roller 102, a conveyance roller 104, and a discharge roller 106. The pickup roller 101 and the separation roller 102 are disposed on a base 118. In the present exemplary embodiment, the sheet conveyance unit 100 includes the sheet supply apparatus. The sheet supply apparatus includes a supply tray 116, regulation guides 411 and 421, the pickup roller 101, and the separation roller 102. In a case of a recording apparatus, the sheet conveyance unit conveys a sheet on which an image is to be recorded, to a recording unit. In this case, the sheet supply apparatus also includes a supply tray, regulation guides, a pickup roller, and a separation roller.

Sheets G placed on the supply tray 116 are preliminarily separated by the pickup roller 101 and conveyed to the separation roller 102. A direction in which the sheets G are conveyed is referred to as a conveyance direction, and a direction intersecting the conveyance direction is referred to as a width direction. The separation roller 102 separates the sheets G one by one with a separation pad 103, and supplies the separated sheet G to the conveyance roller 104. The sheet G is held between the conveyance roller 104 and a conveyance driven roller 105, and is conveyed to the ADF transparent member 201 by rotation of the conveyance roller 104. The sheet G comes into tight contact with the ADF transparent member 201 by a white plate 108 urged by a spring and is read by the reading unit 203. Then, the sheet G is held between the discharge roller 106 and a discharge driven roller 107, and is discharged to a discharge tray 117 by rotation of the discharge roller 106.

<Sheet Placement Part>

Figure 5A:
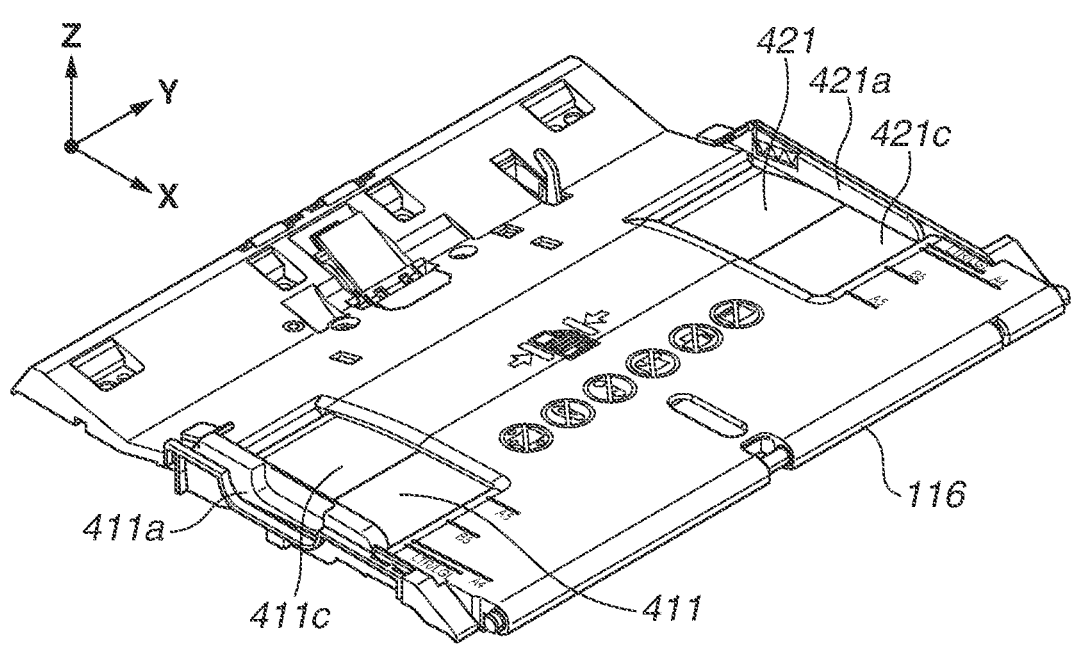
FIGS. 5A and 5B are perspective diagrams each illustrating a sheet placement part.
Figure 5B:
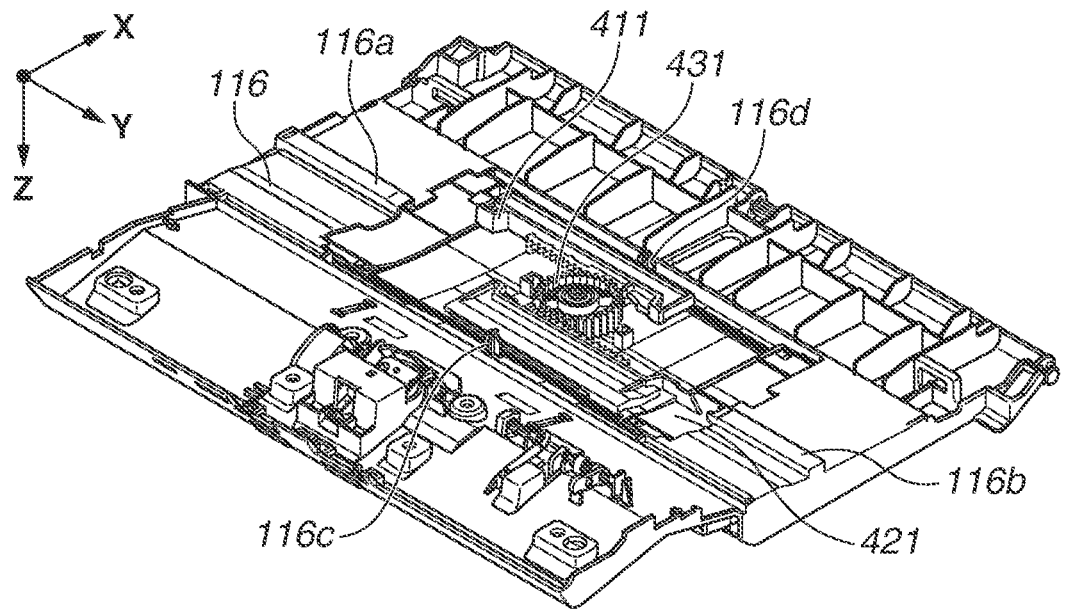

Next, a sheet placement part is described. FIGS. 5A and 5B are diagrams each illustrating a configuration of the sheet placement part. FIG. 5A is a top view, and FIG. 5B is a rear view. The sheet placement part includes the supply tray 116, the regulation guides 411 and 421 in a pair, and a pinion gear 431. The regulation guides 411 and 421 in a pair regulate respective side ends in a width direction of a sheet placed on the supply tray 116. The regulation guides 411 and 421 are movable in a sheet width direction along guide parts 116a and 116b disposed in the supply tray 116. When a user moves one of the regulation guide 411 or the regulation guide 421, the pinion gear 431 rotates, and the other regulation guide is moved in an interlocked manner. In the description below, a redundant description of one of the regulation guide 411 or the regulation guide 421 is omitted in some cases. In the present exemplary embodiment, a center in the sheet width direction is aligned to a reference position in the width direction of the supply tray 116.

Figure 6:
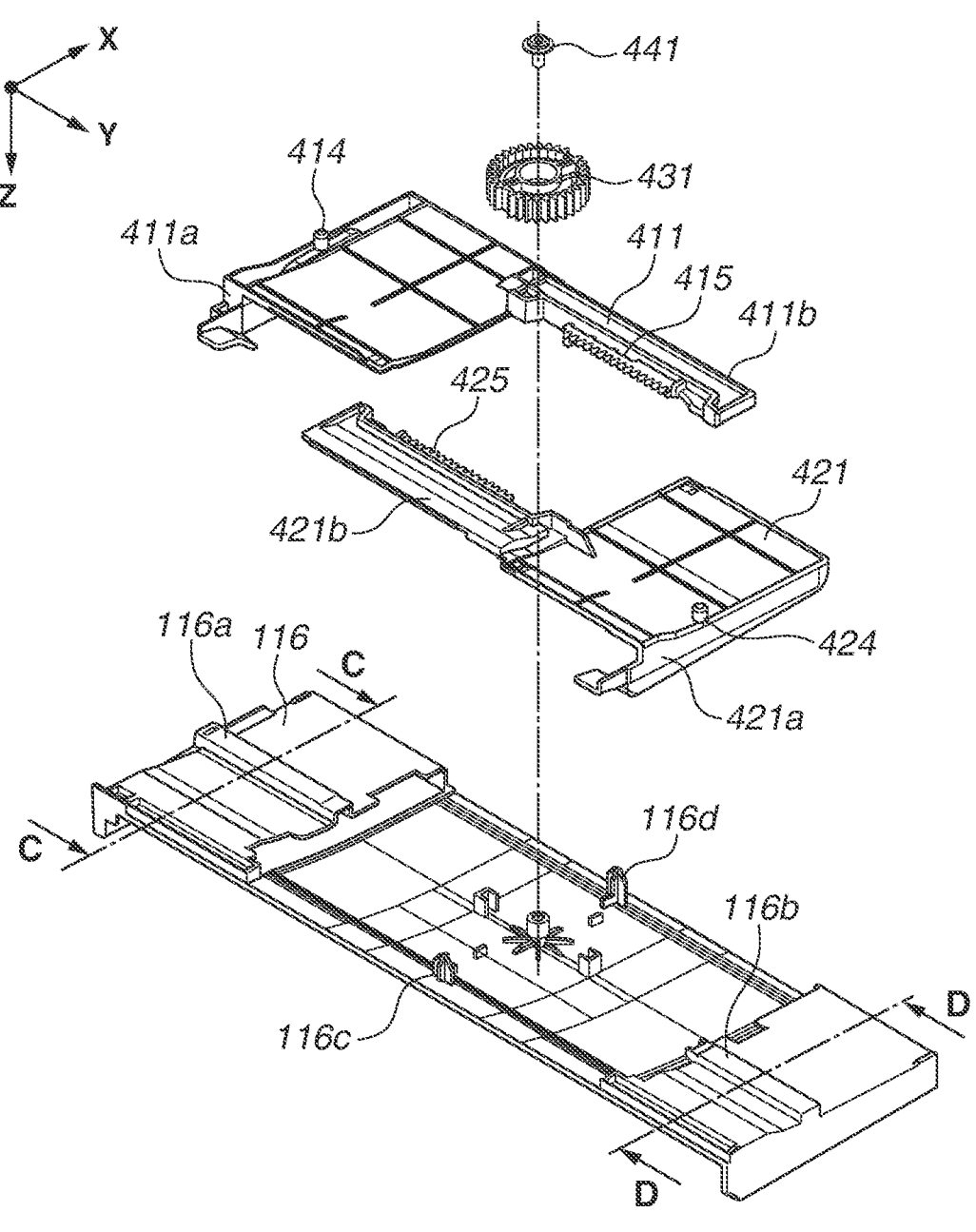
FIG. 6 is an exploded perspective diagram illustrating regulation guides.

FIG. 6 is a diagram illustrating the regulation guides 411 and 421. The pinion gear 431 is rotatably held to a screw receiver disposed in the supply tray 116 by a screw 441. Thus, the pinion gear 431 rotates in a state where the movement in the Z direction and the X-Y direction is regulated. The regulation guides 411 and 421 are guided in the width direction by the guide parts 116a and 116b, respectively, disposed in the supply tray 116. The regulation guide 411 includes a regulation part 411a for regulating the sheet in the width direction, a teeth part 415, a supporting body 411b for supporting the teeth part 415, and a movable surface 411c. Similarly, the regulation guide 421 includes a regulation part 421a, a teeth part 425, a supporting body 421b, and a movable surface 421c. The teeth part 415 and the teeth part 425 serve as rack parts. The supporting body 421b and the supporting body 421b can be included in the rack parts. The teeth part 415 and the teeth part 425 face each other in the conveyance direction, and each engage with the pinion gear 431 disposed between the teeth part 415 and the teeth part 425. The supporting body 411b of the regulation guide 411 is disposed between the pinion gear 431 and a separation regulation part 116d, and the movement in the sheet conveyance direction is regulated. On the other hand, the supporting body 421b of the regulation guide 421 is disposed between the pinion gear 431 and a separation regulation part 116c, and the movement in the conveyance direction is regulated. The movable surface 411c connects the regulation part 411a with the supporting body 411b and moves together with the regulation guide 411. The movable surface 421c connects the regulation part 421a with the supporting body 421b and moves together with the regulation guide 421.

Figure 7A:
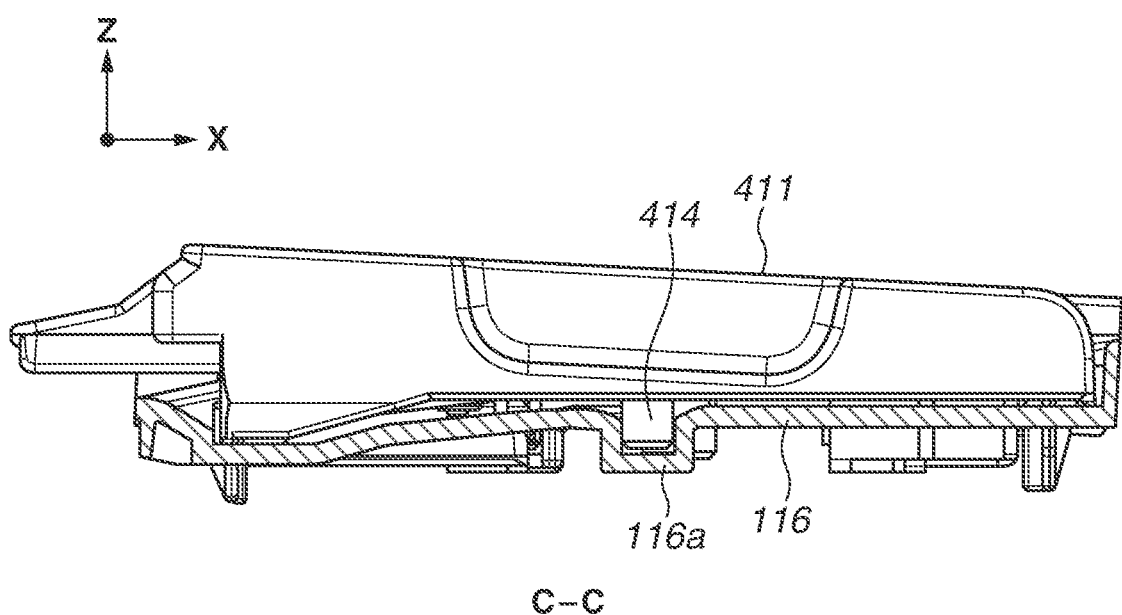
FIGS. 7A and 7B are diagrams each illustrating guide parts provided on the regulation guides.
Figure 7B:
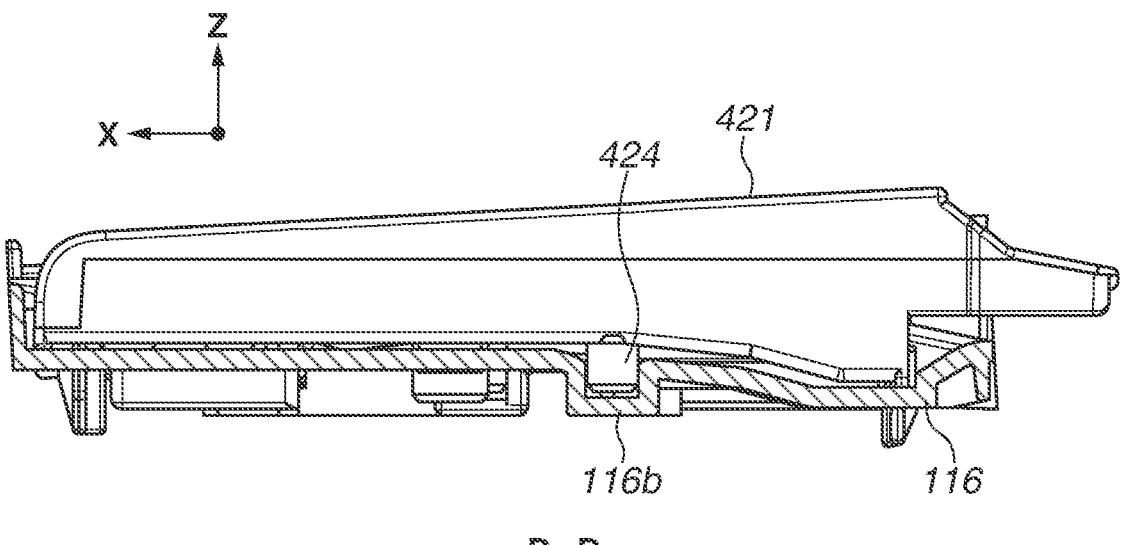

FIGS. 7A and 7B are diagrams illustrating the guide parts 116a and 116b disposed to the regulation guides 411 and 421, respectively. FIG. 7A is a diagram taken along a cross-section line C-C in FIG. 6, and FIG. 7B is a diagram taken along a cross-section line D-D in FIG. 6. The regulation guide 411 includes a convex part 414 having a columnar form. The supply tray 116 includes the guide part 116a in a concave form elongated in the width direction. The convex part 414 can move in the sheet width direction in a state where movement in the conveyance direction is regulated by the guide part 116a. Similarly, the regulation guide 421 includes a convex part 424 in a columnar form. The supply tray 116 includes the guide part 116b in a concave form elongated in the width direction. The convex part 424 can move in the sheet width direction by the guide part 116b.

Figure 8A:
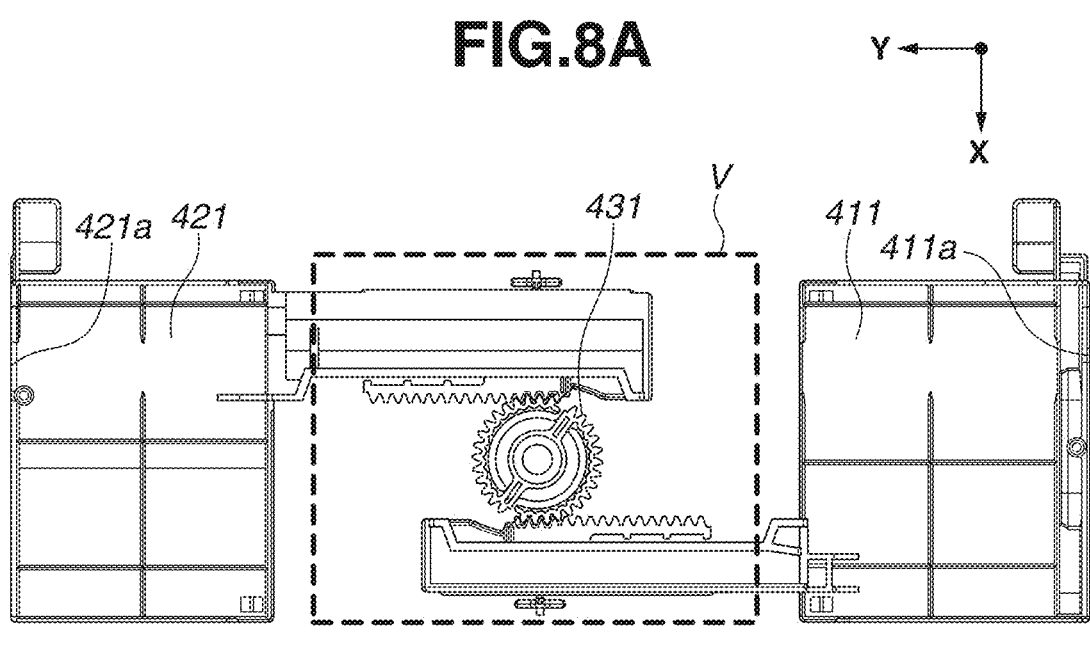
FIGS. 8A and 8B are diagrams each illustrating a state in which the regulation guides and a pinion gear engage with each other.
Figure 8B:
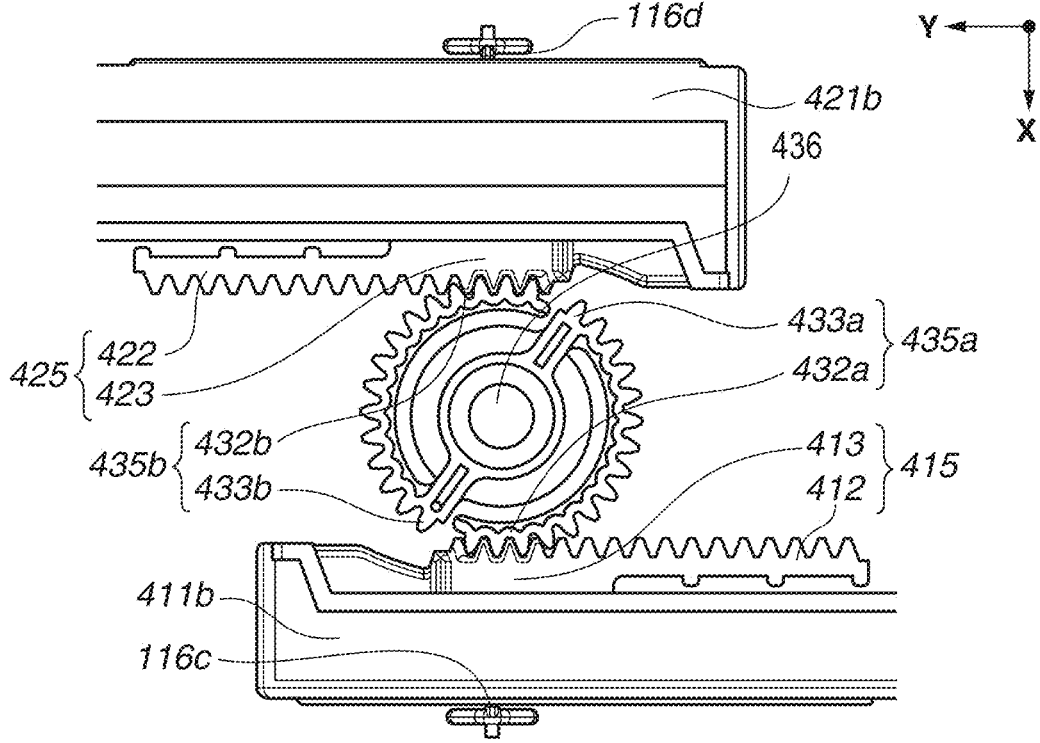

FIGS. 8A and 8B are diagrams each illustrating a state where the regulation guides 411 and 421 and the pinion gear 431 engage with each other. FIG. 8B is an enlarged view of an area V in FIG. 8A. A teeth part 435a of the pinion gear 431 and the teeth part 415 of the regulation guide 411 engage with each other, and a teeth part 435b of the pinion gear 431 and the teeth part 425 of the regulation guide 421 engage with each other. When one of the regulation guide 411 or the regulation guide 421 moves, the pinion gear 431 rotates to move the other regulation guide. At least one of elastic parts 432$a$ and 432$b$ of the pinion gear 431 or elastic parts 412 and 422 of the regulation guides 411 and 421 are displaced in accordance with the position of the regulation guide 411 or the position the regulation guide 421. As a result, the regulation guide 411 is urged by the separation regulation part 116$c$ irrespective of the position, and the regulation guide 421 is urged by the separation regulation part 116$d$ irrespective of the position.

Figure 9A:
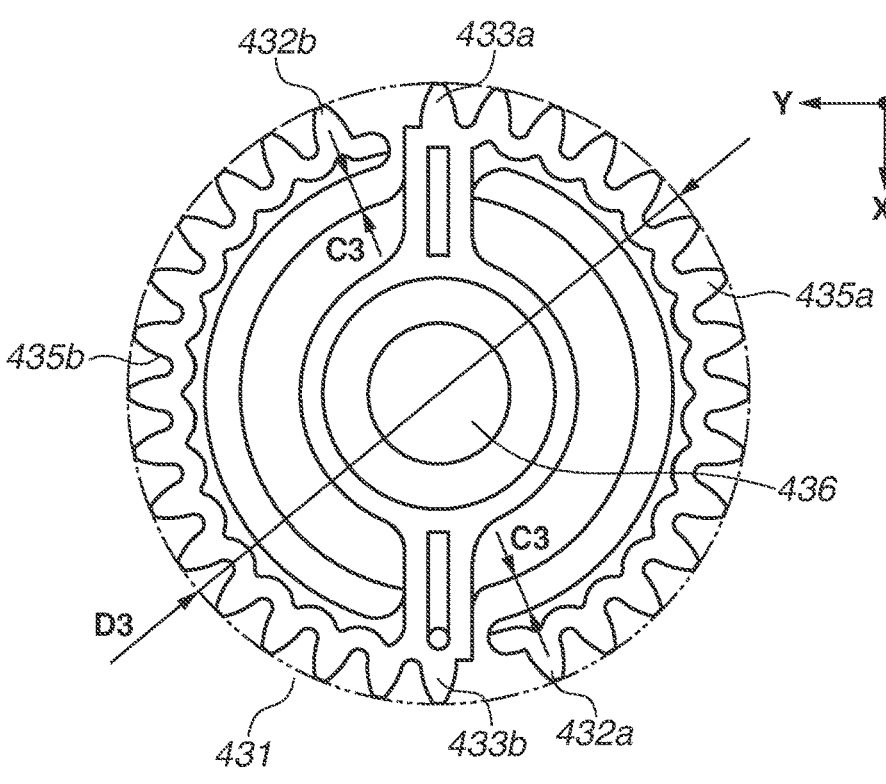
FIGS. 9A to 9C are diagrams illustrating components of the regulation guides and the pinion gear.
Figure 9B:
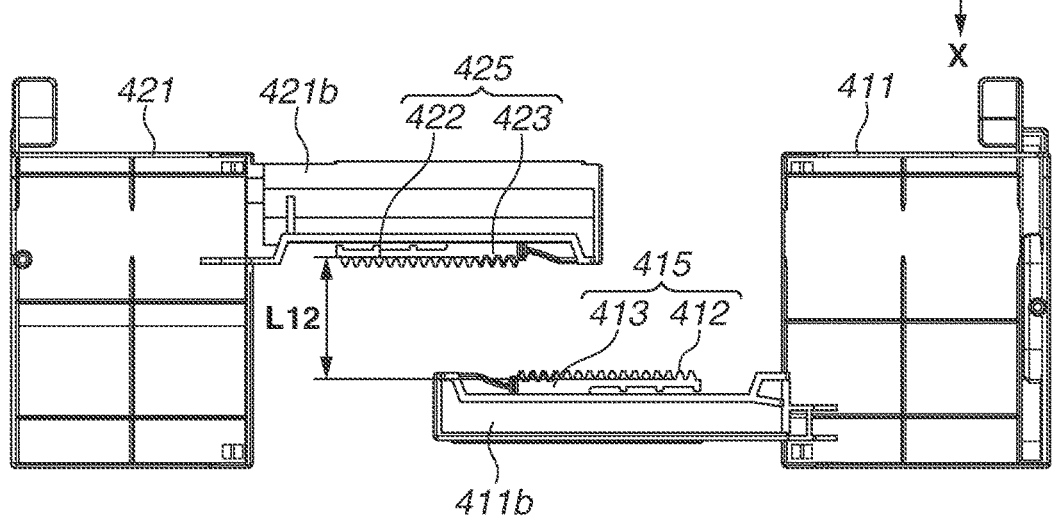
Figure 9C:
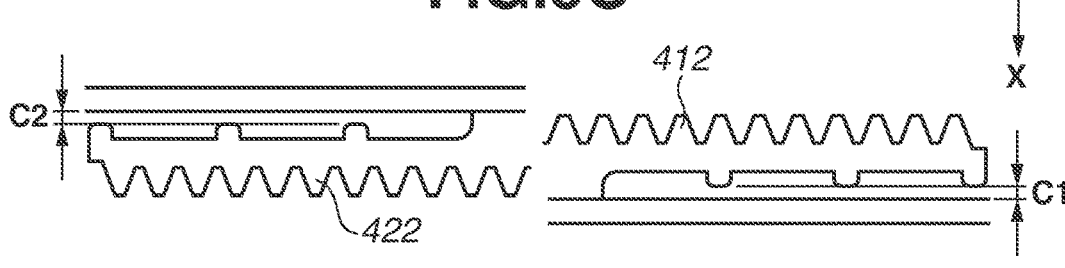

FIGS. 9A to 9C are diagrams illustrating components of the regulation guides 411 and 421 and the pinion gear 431. FIG. 9A is a rear view of the pinion gear 431, FIG. 9B is a rear view of the regulation guides 411 and 421, and FIG. 9C is an enlarged view of the teeth parts 415 and 425 of the regulation guides 411 and 421.

The pinion gear 431, i.e. rotating body, includes a teeth part 435 including a plurality of teeth around a rotation axis 436. The teeth part 435 includes the teeth part 435$a$ having a curved form (curved teeth part) from 0 degrees to 180 degrees in a clockwise direction and the teeth part 435$b$ having a curved form (curved teeth part) from 180 degrees to 360 degrees, as illustrated in FIG. 9A. The teeth part 435$a$ and the teeth part 435$b$ are point symmetrical about the rotation axis 436. The teeth part 435$a$ includes the elastic part 432$a$ and an inelastic part 433$a$ and the teeth part 435$b$ includes the elastic part 432$b$ and an inelastic part 433$b$. An end of the teeth part 435$a$ on a side of the inelastic part 433$a$ and an end of the teeth part 435$b$ on a side of the inelastic part 433$b$ are ends fixed to the pinion gear 431, and the other ends of the elastic parts 432$a$ and 432$b$ are free ends not fixed to the pinion gear 431. In other words, each of the teeth parts 435$a$ and 435$b$ of the pinion gear 431 has a cantilever form. Accordingly, a gap C3 is formed between each of the elastic parts 432$a$ and 432$b$ and an inner portion of the pinion gear 431, with the gap C3 surrounding at least a part of the rotation axis 436. When the elastic part 432$a$ is pushed toward the rotation axis 436, the elastic part 432$a$ elastically deforms toward the rotation axis 436 of the pinion gear 431 within a range of the gap C3 from a teeth tip circle diameter D3. Similarly, when the elastic part 432$b$ is pushed toward the rotation axis 436, the elastic part 432$b$ elastically deforms toward the rotation axis 436 of the pinion gear 431 within the range of the gap C3 from the teeth tip circle diameter D3.

The regulation guide 411 includes the teeth part 415 having a linear form (linear teeth part), and the teeth part 415 includes the elastic part 412 and an inelastic part 413. Similarly, the regulation guide 421 includes the teeth part 425 having a linear form (linear teeth part), and the teeth part 425 includes the elastic part 422 and an inelastic part 423. A distance L12 indicates a distance between a teeth bottom of the regulation guide 411 and a teeth bottom of the regulation guide 421. In the teeth parts 415 and 425 of the regulation guides 411 and 421, ends of the inelastic parts 413 and 423 are fixed ends fixed to the supporting bodies 411$b$ and 421$b$, and ends of the elastic parts 412 and 422 are free ends not fixed to the supporting bodies 411$b$ and 421$b$. In other words, each of the teeth parts 415 and 425 of the regulation guides 411 and 421 has a cantilever form. Accordingly, a gap C1 is formed between the supporting body 411$b$ and the elastic part 412 of the regulation guide 411. Similarly, a gap C2 is formed between the supporting body 421$b$ and the elastic part 422 of the regulation guide 421.

When the elastic part 412 is pushed toward the supporting body 411$b$, a teeth bottom of the elastic part 412 elastically deforms toward the supporting body 411$b$ within a range of the gap C1. Similarly, when the elastic part 422 is pushed toward the supporting body 421$b$, a teeth bottom of the elastic part 422 elastically deforms toward the supporting body 421$b$ within a range of the gap C2. Accordingly, the distance L12 between the teeth bottom of the elastic part 412 and the teeth bottom of the elastic part 422 is increased. The teeth tip circle diameter D3 of the pinion gear 431 is greater than the distance L12 between a teeth bottom of the teeth part 415 and a teeth bottom of the teeth part 425. Further, a sum of the gap C1 and the gap C3 is greater than (D3−L12)/2, and a sum of the gap C2 and the gap C3 is greater than (D3−L12)/2. Accordingly, the elastic part 432$a$ of the pinion gear 431 and the elastic part 412 of the teeth part 415 can elastically deform within a range of (D3-L12)/2 in total. Likewise, the elastic part 432$b$ of the pinion gear 431 and the elastic part 422 of the teeth part 425 can elastically deform within a range of (D3-L12)/2 in total.

The teeth parts 415 and 425 of the regulation guides 411 and 421 can be fixed to the supporting bodies 411$b$ and 421$b$, respectively, without the elastic parts. Even in this case, because the pinion gear 431 includes the elastic parts 432$a$ and 432$b$, the regulation guides 411 and 421 can be downsized.

<Action of Regulation Guides and Pinion Gear>

An interaction between the regulation guides 411 and 421 and the pinion gear 431 according to the present exemplary embodiment is described with reference to FIGS. 10A and 10B to FIGS. 16A and 16B. FIGS. 10A and 10B, FIGS. 11A and 11B, and FIGS. 12A and 12B illustrate relationships between the regulation guides 411 and 421 and the pinion gear 431 in a state in which the regulation guides 411 and 421 are at a first position, a second position, and a third position, respectively. Further, FIG. 13, FIG. 14, and FIG. 15 are perspective diagrams illustrating entire views of the image reading apparatus 1 in a state in which the regulation guides 411 and 421 are at the first position, the second position, and the third position, respectively.

At the first position, a distance between the regulation part 411$a$ and the regulation part 421$a$ in the width direction corresponds to a sheet having the maximum size. At the second position, the distance between the regulation part 411$a$ and the regulation part 421$a$ in the width direction corresponds to a sheet having the minimum size. At the third position, the distance between the regulation part 411$a$ and the regulation part 421$a$ in the width direction corresponds to a sheet having a middle size.

Figure 10A:
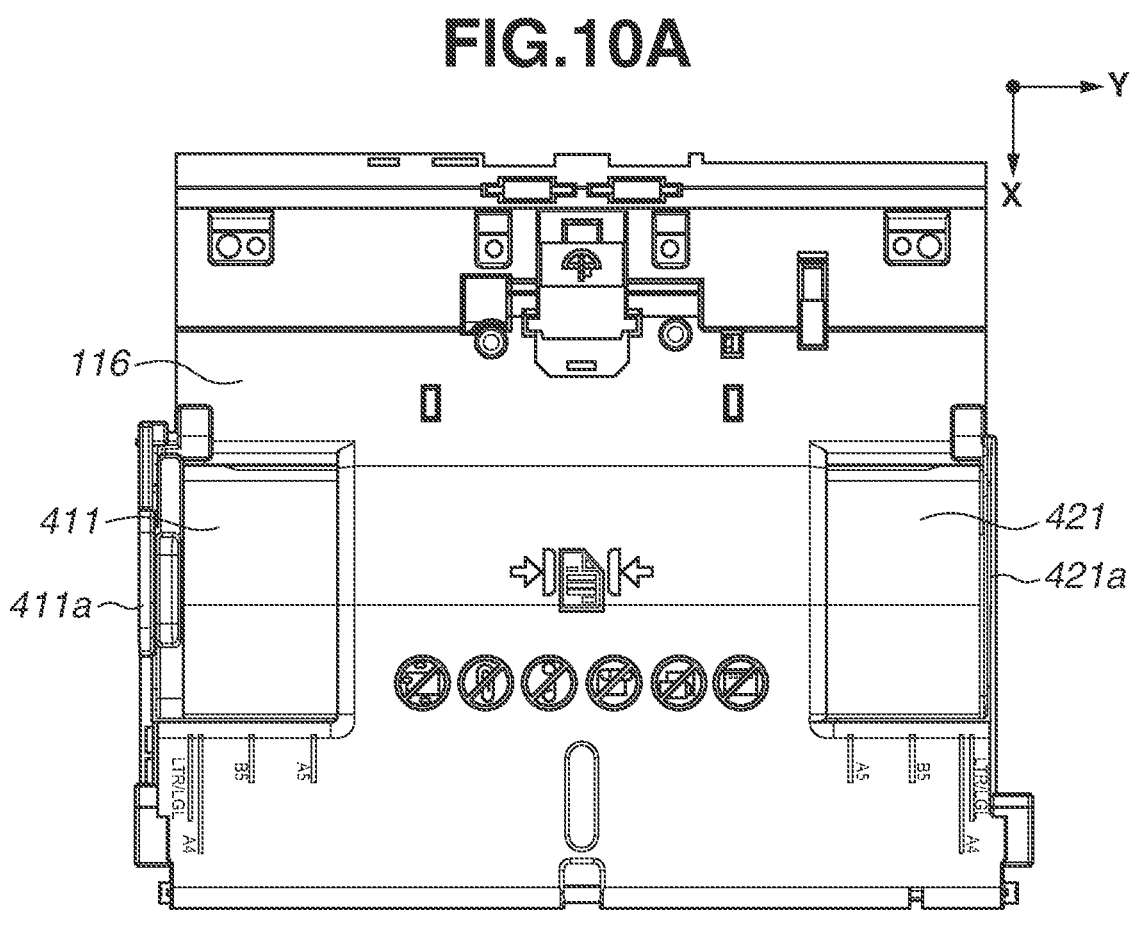
FIGS. 10A and 10B are diagrams illustrating a relationship between the regulation guides and the pinion gear in a state in which the regulation guides are at a first position.
Figure 10B:
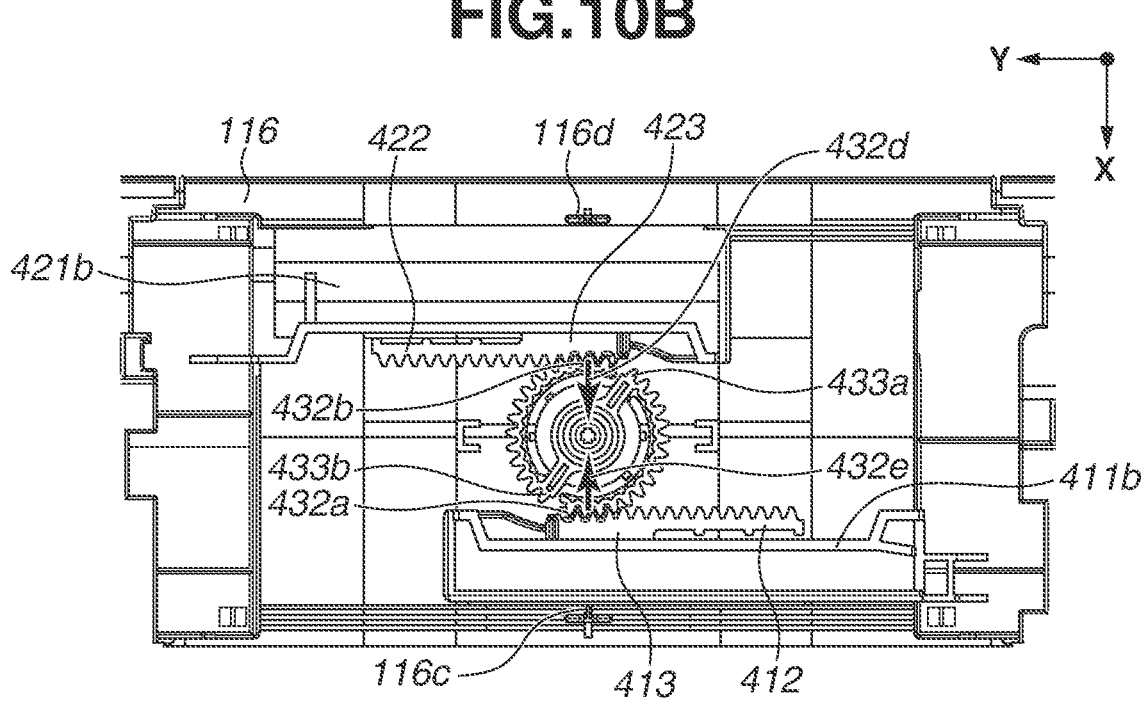
Figure 13:
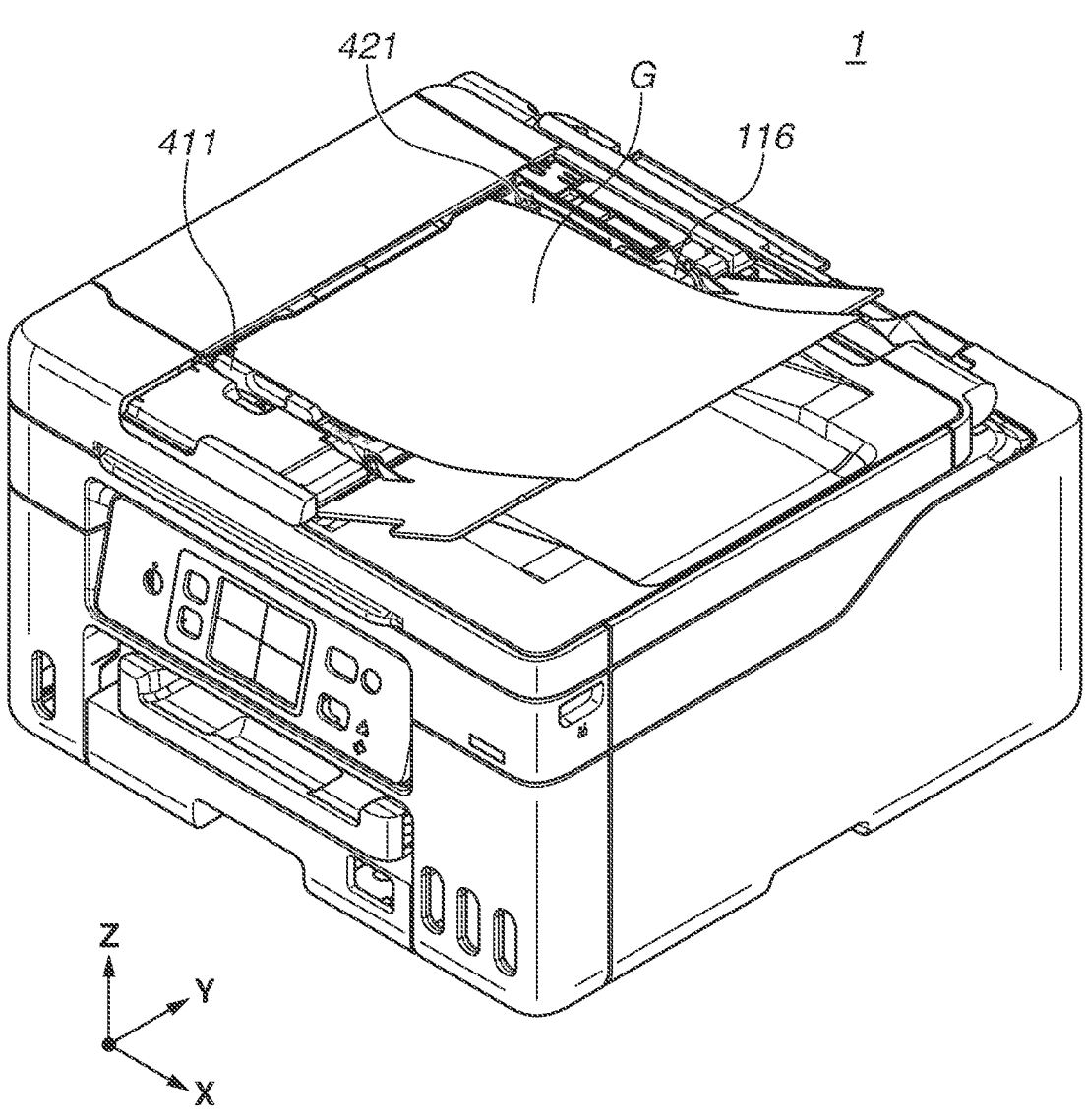
FIG. 13 is a perspective diagram illustrating the image reading apparatus in a state in which the regulation guides are at the first position.

As illustrated in FIGS. 10A and 10B and FIG. 13, the first position corresponds to a case where the side ends of the sheet G having the maximum size, placed on the supply tray 116, are regulated by the regulation guide 411 and the regulation guide 421. The distance between the regulation part 411$a$ and the regulation part 421$a$ at the first position is about the maximum distance within a possible distance range. In this state, the elastic part 432$b$ of the pinion gear 431 and the inelastic part 423 of the regulation guide 421 engage with each other, and the elastic part 432$a$ of the pinion gear 431 and the inelastic part 413 of the regulation guide 411 engage with each other. In the conveyance direction, the inelastic part 413 of the regulation guide 411 is at a position facing the inelastic part 423 of the regulation guide 421 across the pinion gear 431. The elastic part 432$b$ is displaced in a direction of an arrow 432$d$ indicating a direction toward the rotation axis, and the elastic part 432$a$ is displaced in a direction of an arrow 432$e$ indicating a direction toward the rotation axis. Accordingly, the elastic part 432$b$ presses the regulation guide 421 via the teeth part 425, and the elastic part 432$a$ presses the regulation guide 411 via the teeth part 415.

Figure 11A:
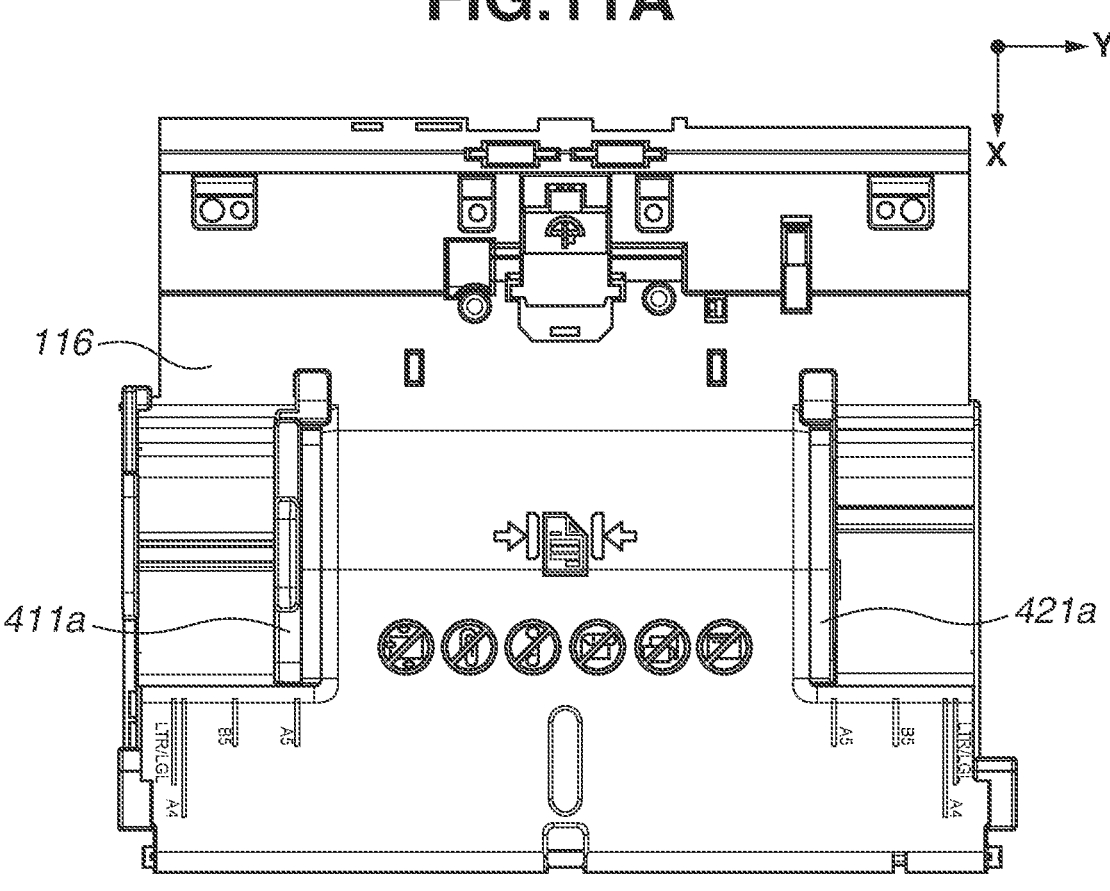
FIGS. 11A and 11B are diagrams illustrating the relationship between the regulation guides and the pinion gear in a state in which the regulation guides are at a second position.
Figure 11B:
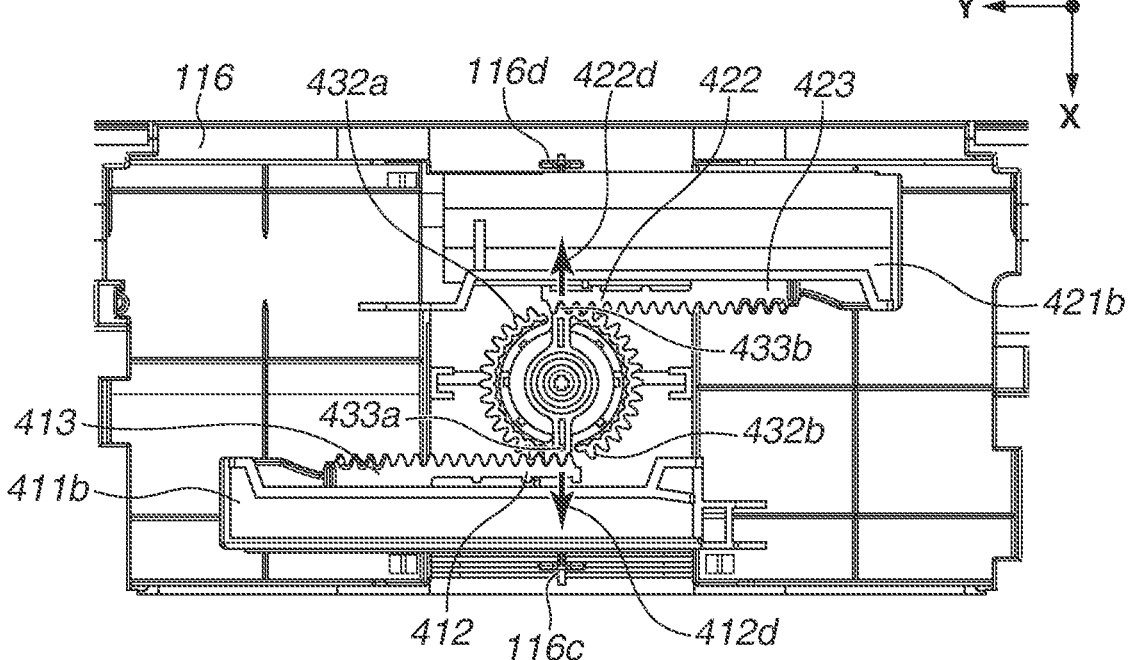
Figure 14:
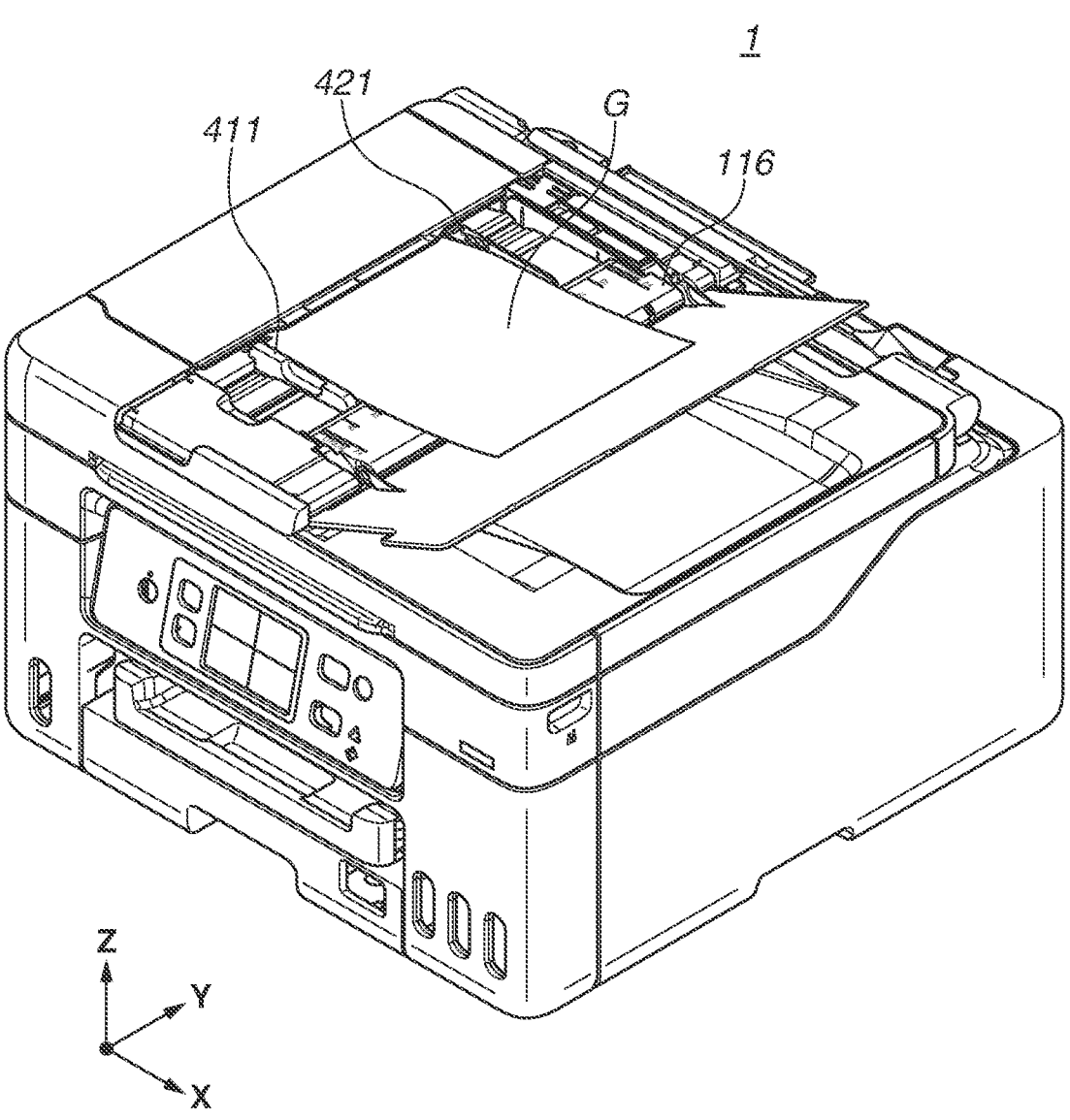
FIG. 14 is a perspective diagram illustrating the image reading apparatus in a state in which the regulation guides are at the second position.
Figure 15:
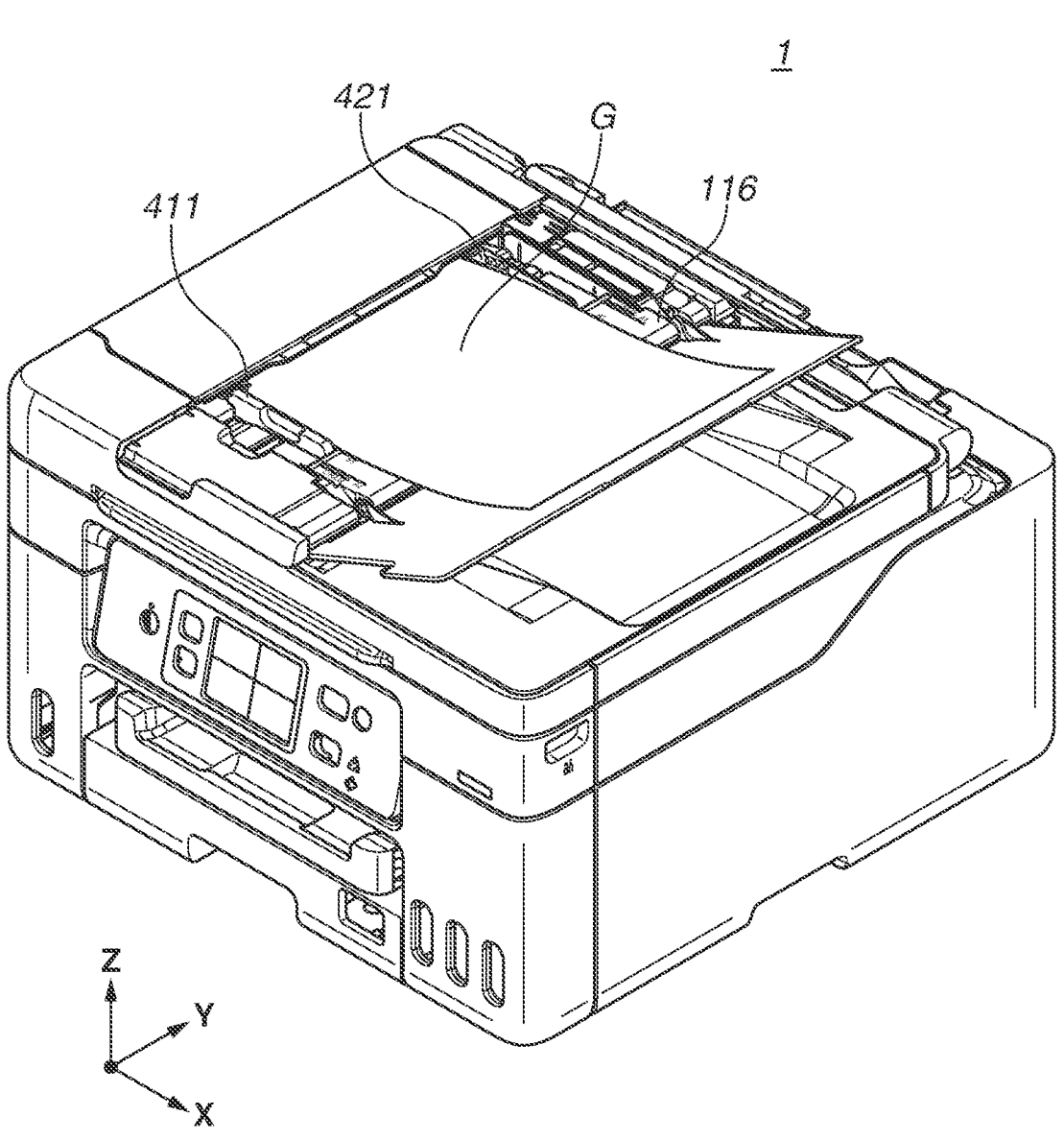
FIG. 15 is a perspective diagram illustrating the image reading apparatus in a state in which the regulation guides are at the third position.

As illustrated in FIGS. 11A and 11B and FIG. 14, the second position corresponds to a case where the side ends of the sheet G having the minimum size, placed on the supply tray 116, are regulated by the regulation guide 411 and the regulation guide 421. The distance between the regulation part 411*a* and the regulation part 421*a* at the second position is about the minimum distance within the possible distance range. In this state, the inelastic part 433*b* of the pinion gear 431 engages with the elastic part 422 of the regulation guide 421, and the inelastic part 433*a* of the pinion gear 431 engages with the elastic part 412 of the regulation guide 411. In the conveyance direction, the free end of the elastic part 412 of the regulation guide 411 is at a position facing the free end of the elastic part 422 of the regulation guide 421 across the pinion gear 431. The elastic part 422 is displaced in a direction of an arrow 422*d* indicating a direction toward the separation regulation part 116*d*, and the elastic part 412 is displaced in a direction of an arrow 412*d* indicating a direction toward the separation regulation part 116*c*. Accordingly, the inelastic part 433*b* presses the regulation guide 421 via the teeth part 425, and the inelastic part 433*a* presses the regulation guide 411 via the teeth part 415.

Figure 12A:
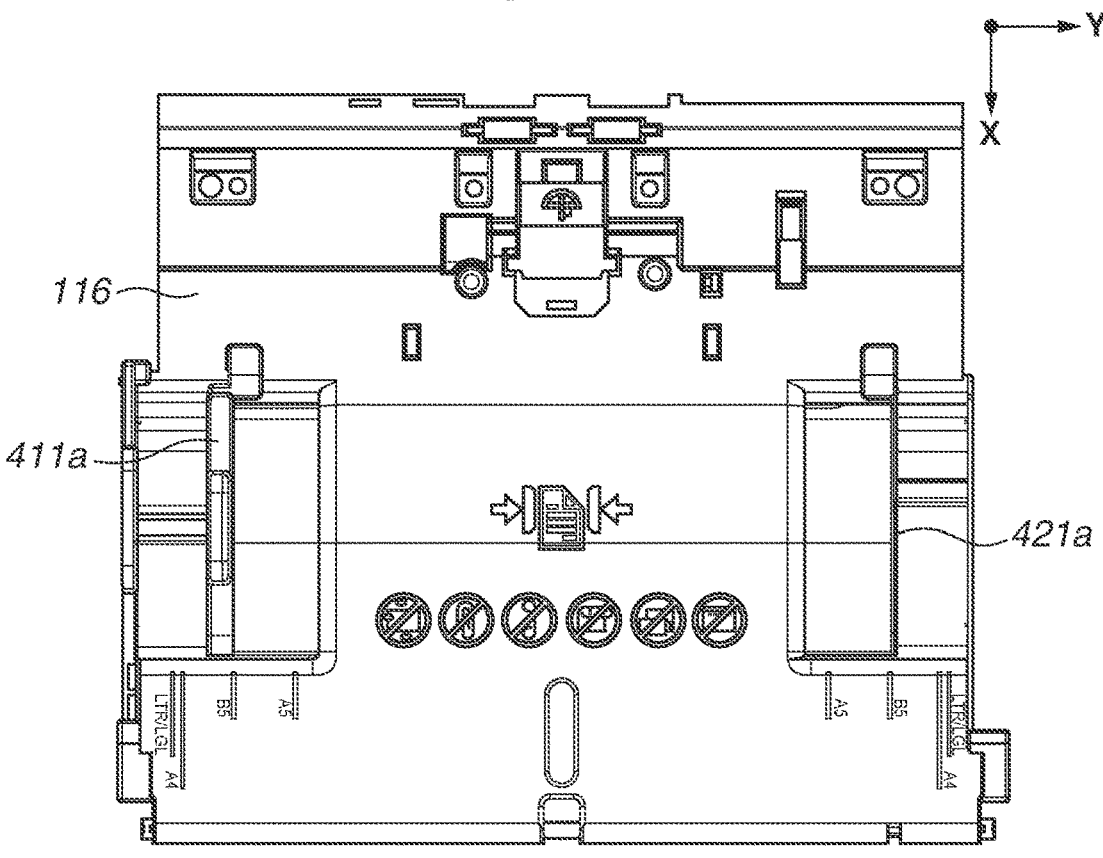
FIGS. 12A and 12B are diagrams illustrating the relationship between the regulation guides and the pinion gear in a state in which the regulation guides are at a third position.
Figure 12B:
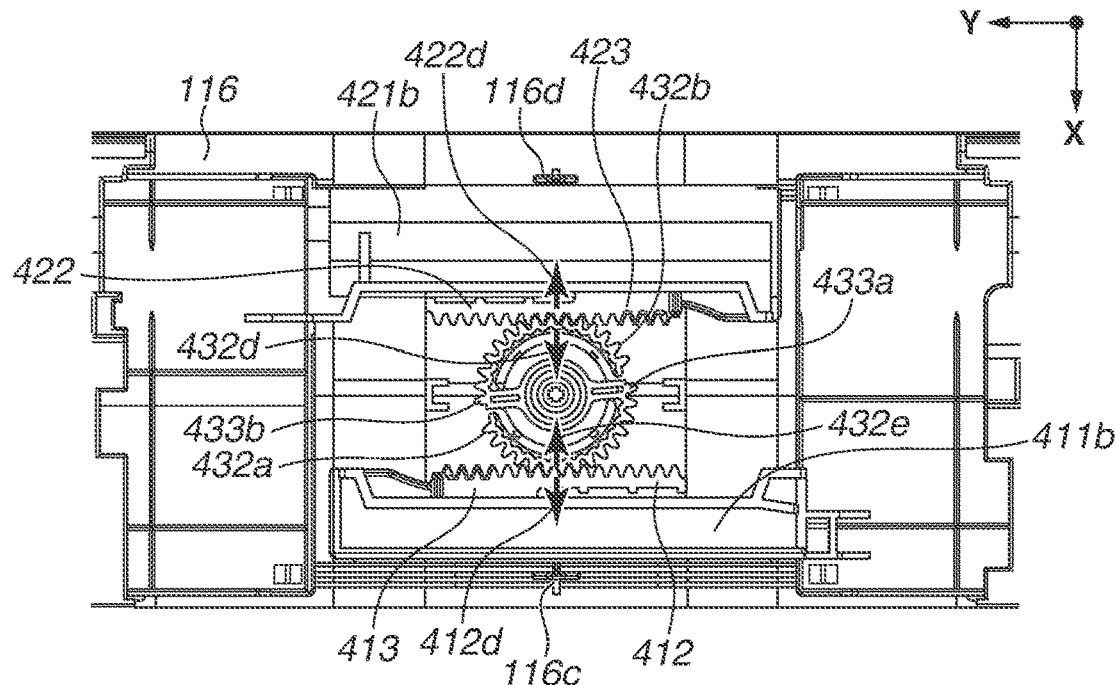

As illustrated in FIGS. 12A and 12B and FIG. 15, the third position corresponds to a case where the side ends of the sheet G having the middle size, placed on the supply tray 116, are regulated by the regulation guide 411 and the regulation guide 421. The distance between the regulation part 411*a* and the regulation part 421*a* is less than the distance at the first position, and is greater than the distance at the second position in the sheet width direction. In this state, the elastic part 432*a* of the pinion gear 431 engages with the elastic part 412 of the regulation guide 411, and the elastic part 432*b* of the pinion gear 431 engages with the elastic part 422 of the regulation guide 421. The elastic part 412 is displaced in the direction of the arrow 412*d*, and the elastic part 422 is displaced in the direction of the arrow 422*d*. Meanwhile, the elastic part 432*b* is displaced in the direction of the arrow 432*d*, and the elastic part 432*a* is displaced in the direction of the arrow 432*e*. The inelastic parts 413 and 423 do not engage with the elastic parts 432*a* and 432*b*, respectively. As a result, the elastic part 432*a* presses the elastic part 412, and the elastic part 432*b* presses the elastic part 422. In other words, the elastic part 432*b* presses the regulation guide 421 via the teeth part 425, and the elastic part 432*a* presses the regulation guide 411 via the teeth part 415.

The position of the regulation guide 411 and the position of the regulation guide 421 can be moved by the user as illustrated in FIGS. 10A and 10B to FIGS. 12A and 12B. The regulation guide 411 and the regulation guide 421 each interlock and move the other regulation guide through the pinion gear 431. Here, a case where the regulation guide 411 moves from the first position to the second position is described. In a case where the regulation guide 411 moves from the second position to the first position, reverse operation is performed. The regulation guide 421 similarly moves with movement of the regulation guide 411. Thus, the redundant description is omitted.

When the regulation guide 411 is at the first position, the free end of the elastic part 432*a* of the pinion gear 431 engages with the inelastic part 413 (FIG. 10B). The pinion gear 431 rotates with movement of the regulation guide 411 from the first position to the third position. In response to the rotation, the engagement position of the pinion gear 431 moves from the free end to the center part of the elastic part 432*a*. On the other hand, the engagement position of the regulation guide 411 moves from the inelastic part 413 to the fixed end side of the elastic part 412.

When the regulation guide 411 reaches the third position, the center part of the elastic part 432*a* of the pinion gear 431 and the fixed end side of the elastic part 412 engage with each other (FIG. 12B). When the regulation guide 411 further moves from the third position to the second position, the pinion gear 431 rotates with movement of the regulation guide 411. The engagement position of the pinion gear 431 moves from the center part of the elastic part 432*a* to the inelastic part 433*a*. Meanwhile, the engagement position of the regulation guide 411 moves from the fixed end side to the free end of the elastic part 412. At the second position, the inelastic part 433*a* of the pinion gear 431 engages with the free end of the elastic part 412 (FIG. 11B).

The teeth tip circle diameter D3 of the pinion gear 431 is greater than the distance L12 between the teeth bottom of the teeth part 415 and the teeth bottom of the teeth part 425. With the movement of the regulation guides 411 and 421 from the first position to the second position, displacement of the elastic parts 432*a* and 432*b* of the pinion gear 431 is gradually reduced. If each of the regulation guides 411 and 421 includes no elastic part, pressing force by the elastic parts 432*a* and 432*b* is gradually increased. In contrast, displacement of the elastic parts 412 and 422 is increased. If the pinion gear 431 includes no elastic part, the pressing force by the regulation guides 411 and 421 is gradually reduced. In the present exemplary embodiment, a sum of displacement of the elastic parts 432*a* and 432*b* of the pinion gear 431 and the elastic parts 412 and 422 of the regulation guides 411 and 421 is not largely varied. Thus, variation of the pressing force pressing the regulation guide 411 against the separation regulation part 116*c* and variation of the pressing force pressing the regulation guide 421 against the separation regulation part 116*d* based on a position in the width direction are small. This allows the operation force by the user to operate the regulation guides to be uniform irrespective of the position of the regulation guides.

The relationship between the fixed ends and the free ends of the elastic parts 412 and 422 of the regulation guides 411 and 421 and the relationship between the fixed ends and the free ends of the elastic parts 432*a* and 432*b* of the pinion gear 431 may be changed. In this case, for example, when the regulation guides 411 and 421 move from the second position to the first position, displacement of the elastic parts 432*a* and 432*b* of the pinion gear 431 is gradually reduced and displacement of the elastic parts 412 and 422 is increased.

As described above, due to displacement of at least one of the elastic parts 432*a* and 432*b* of the pinion gear 431 and the elastic parts 432*a* and 432*b* of the regulation guides 411 and 421, backlash between the pinion gear 431 and the regulation guides 411 and 421 is prevented. Further, it is possible to appropriately position the regulation guides 411 and 421 at predetermined positions corresponding to the sheet width. Furthermore, it is possible to downsize the regulation guides 411 and 421.

Figure 16A:
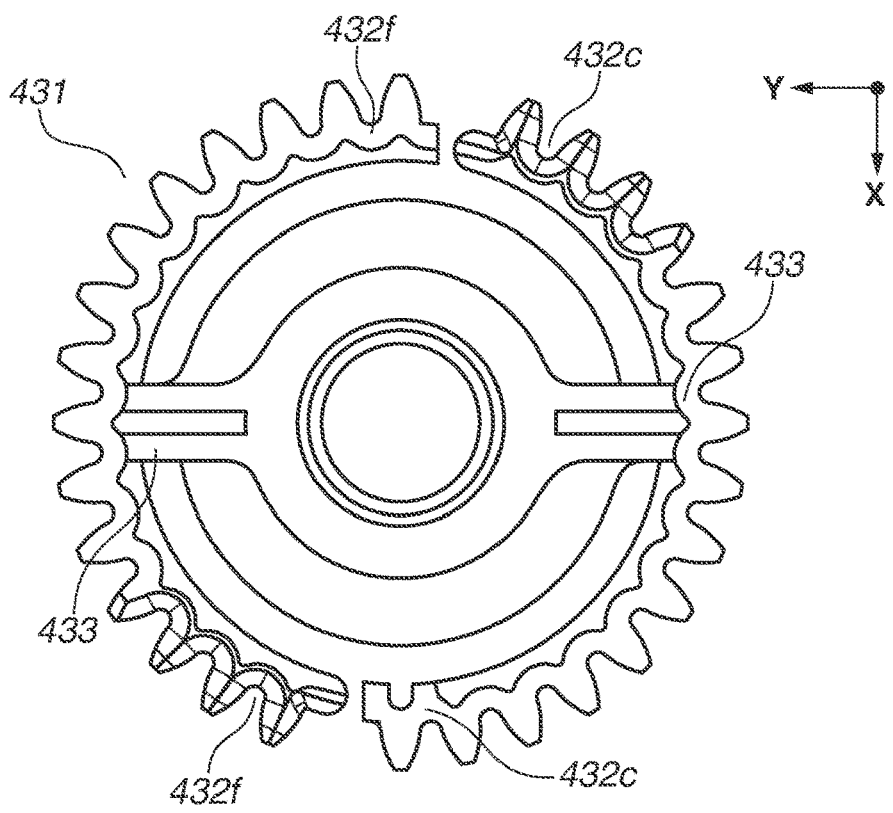
FIGS. 16A and 16B are front diagrams each illustrating a pinion gear according to a second exemplary embodiment.
Figure 16B:
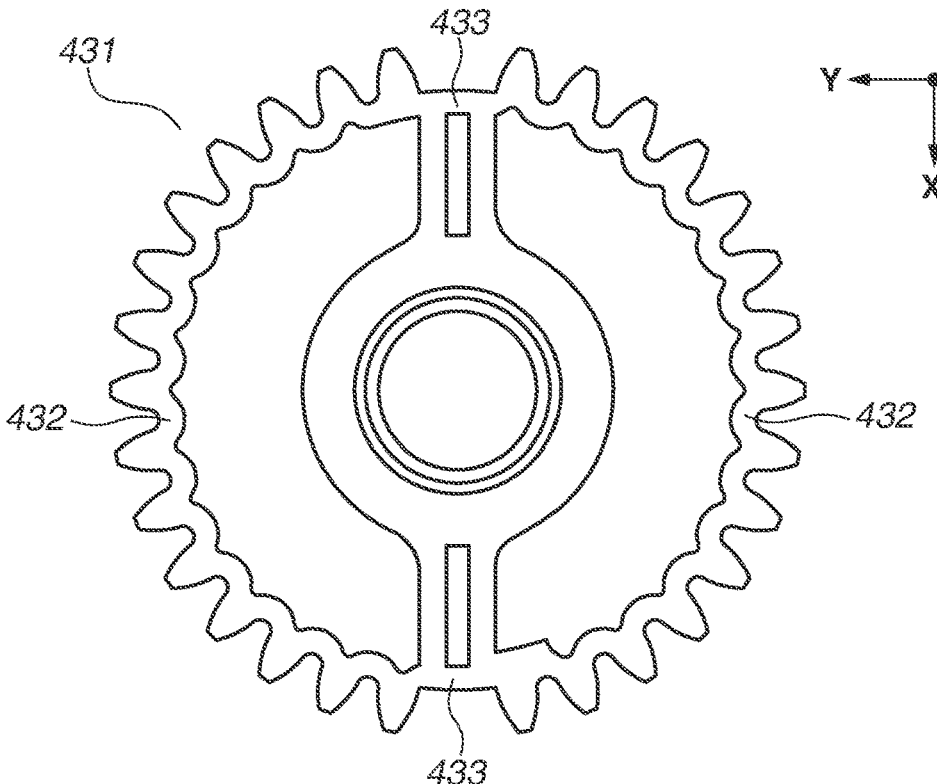

FIGS. 16A and 16B are diagrams each illustrating the pinion gear 431 according to a second exemplary embodiment. FIG. 16A illustrates a configuration in which inelastic parts 433 of the pinion gear 431 are each disposed at a position of a center part between elastic parts 432*c* and 432*f*. In this configuration, elastic deformation of an end of the elastic parts 432*c* is large. FIG. 16B illustrates a configuration in which elastic parts 432 and the inelastic parts 433 of the pinion gear 431 are coupled in a circumferential direction of the pinion gear 431. Accordingly, elastic deformation does not occur on the inelastic parts 433, and elastic deformation of the center parts of the elastic parts 432 is large.

Figure 17A:
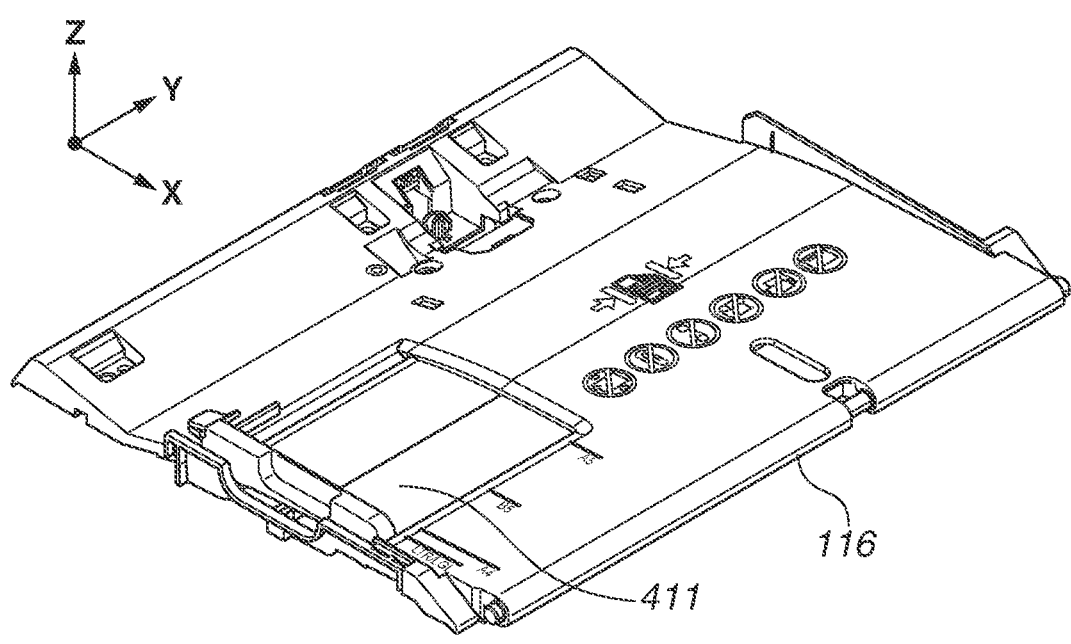
FIGS. 17A and 17B are diagrams illustrating a sheet placement part according to a third exemplary embodiment.
Figure 17B:
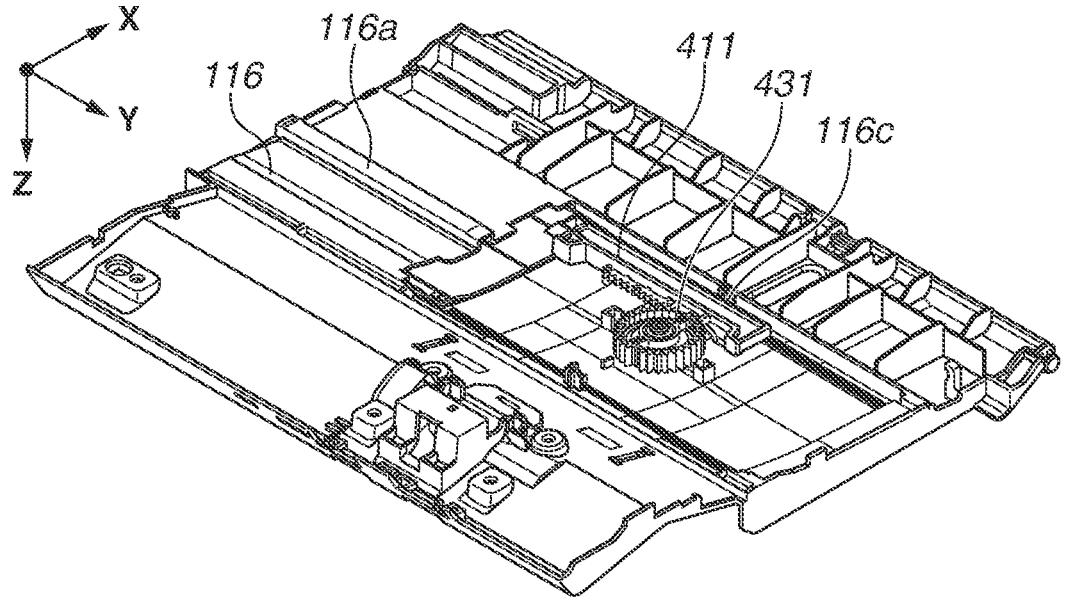

FIGS. 17A and 17B are diagrams each illustrating a sheet placement part according to a third exemplary embodiment. In the first exemplary embodiment, the regulation guides 411 and 421 in a pair move in an interlocked manner, whereas in the third exemplary embodiment, one of the regulation guides 411 and 421 is movable (regulation guide 411), and the other regulation guide is fixed (regulation guide 421). The pinion gear 431 engages with the movable regulation guide 411. In this case, the sheet is positioned with respect to the fixed regulation guide. The movable regulation guide is similar to the regulation guide 411 according to the first exemplary embodiment. In the case of the sheet G having the maximum size, the elastic part 432*a* of the pinion gear 431 and the inelastic part 413 of the regulation guide 411 engage with each other. In the case of the sheet G having the minimum size, the inelastic part 433*a* of the pinion gear 431 engages with the elastic part 412 of the regulation guide 411.

With the movement of the movable regulation guide 411 from the first position to the second position, displacement of the elastic part 432*a* of the pinion gear 431 is gradually reduced. In a case where the movable regulation guide 411 includes no elastic part, the pressing force by the elastic part 432*a* is gradually increased. Meanwhile, displacement of the elastic part 412 is gradually increased. In a case where the pinion gear 431 includes no elastic part, the pressing force by the movable regulation guide 411 is gradually increased.

In this configuration, the operation force by the user to operate the regulation guide is substantially uniform irrespective of the position of the regulation guide.

As described above, due to displacement of at least one of the elastic part 432*a* of the pinion gear 431 and the elastic part 412 of the movable regulation guide 411, backlash between the pinion gear 431 and the movable regulation guide 411 is prevented. Further, it is possible to appropriately position the movable regulation guide 411 at a predetermined position corresponding to the sheet width. Furthermore, it is possible to downsize the movable regulation guide 411.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2022-112007, filed Jul. 12, 2022, which is hereby incorporated by reference herein in its entirety.

What is claimed is:

1. A sheet supply apparatus comprising:
a tray on which a sheet is to be placed;
a regulation guide disposed to the tray and configured to regulate a side end of the sheet in a width direction by moving between a first position and a second position;
a supporting body including a first teeth part and configured to move in the width direction together with the regulation guide; and
a rotating body including an elastic part having a second teeth part engaging with the first teeth part of the supporting body and configured to rotate with movement of the supporting body,
wherein the first teeth part has a linear form and includes a fixed end that is fixed to the supporting body and a free end that is not fixed to the supporting body, wherein the elastic part is provided on an outer periphery of the rotating body and includes a fixed end that is fixed to the rotating body and a free end that is not fixed to the rotating body, and
wherein a free end side of the second teeth comes into contact with the fixed end side of the first teeth in case that the regulation guide is at the first position and a fixed end side of the second teeth comes into contact with the free end side of the first teeth in case that the regulation member is at the second position.

2. The sheet supply apparatus according to claim 1,
wherein displacement of the second teeth part is by an amount that is larger at the first position in comparison with an amount of the displacement of the second teeth part at the second position.

3. The sheet supply apparatus according to claim 2, wherein the displacement of the second teeth part is reduced with movement of the regulation guide from the first position to the second position.

4. The sheet supply apparatus according to claim 1, wherein displacement of the first teeth part to the supporting body varies based on a position of the regulation guide.

5. The sheet supply apparatus according to claim 1,
wherein displacement of the first teeth part is by an amount that is larger at the second position in comparison with an amount of the displacement of the first teeth part at the first position.

6. The sheet supply apparatus according to claim 5, wherein the displacement of the first teeth part is increased with movement of the regulation guide from the first position to the second position.

7. The sheet supply apparatus according to claim 1, wherein the tray includes a guide part configured to guide the supporting body in the width direction.

8. The sheet supply apparatus according to claim 1, wherein the tray includes a regulation part configured to regulate movement of the supporting body in a conveyance direction.

9. The sheet supply apparatus according to claim 1,
wherein the supporting body includes a first supporting body including a first linear teeth part and a second supporting body including a second linear teeth part, and
wherein the rotating body includes a first curved teeth part engaging with the first linear teeth part and a second curved teeth part configured to engage with the second linear teeth part.

10. The sheet supply apparatus according to claim 9, wherein the second supporting body is configured to move with movement of the first supporting body.

11. The sheet supply apparatus according to claim 9, wherein the first curved teeth part and the second curved teeth part are point symmetrical about a rotation axis of the rotating body.

12. The sheet supply apparatus according to claim 9,
wherein the first curved teeth part has a curved form and includes a fixed end that is fixed to the rotating body and a free end that is not fixed to the rotating body.

13. An image reading apparatus comprising:
a tray on which a sheet is to be placed;
a regulation guide disposed to the tray and configured to regulate a side end of the sheet in a width direction by moving between a first position and a second position;
a supporting body including a first teeth part and configured to move in the width direction together with the regulation guide;

a rotating body including an elastic part having a second teeth part engaging with the first teeth part of the supporting body and configured to rotate with movement of the supporting body; and a reading unit configured to read an image of the sheet supplied from the tray, wherein the first teeth part has a linear form and includes a fixed end that is fixed to the supporting body and a free end that is not fixed to the supporting body, wherein the elastic part is divided into two separate parts, with each of the two separate parts having a cantilever form, and is provided on an outer periphery of the rotating body, including a fixed end that is fixed to the rotating body and a free end that is not fixed to the rotating body, and wherein the free end side of the comes into contact with the fixed end side of the first teeth in case that the regulation guide is at the first position and the fixed end side of the second teeth comes into contact with the free end side of the first teeth in case that the regulation member is at the second position.

14. The image reading apparatus of claim 13, further comprising:

a first gap formed between a first separate part of the second teeth part and an inner part of the rotating body.

15. The image reading apparatus of claim 14, further comprising:

a second gap formed between a second separate part of the second teeth part and the inner part of the rotating body.

16. The image reading apparatus of claim 15, wherein the first separate part and the second separate part are provided on opposite sides of a rotation axis.

17. A recording apparatus comprising:

a tray on which a sheet is to be placed;

a regulation guide disposed to the tray and configured to regulate a side end of the sheet in a width direction by moving between a first position and a second position;

a supporting body including a first teeth part and configured to move in the width direction together with the regulation guide;

a rotating body including an elastic part having a second teeth part engaging with the first teeth part of the supporting body and configured to rotate with movement of the supporting body; and a recording unit configured to record an image on the sheet supplied from the tray, wherein the first teeth part has a linear form and includes a fixed end that is fixed to the supporting body and a free end that is not fixed to the supporting body, wherein the elastic part is divided into two separate parts and is provided on an outer periphery of the rotating body, including a fixed end that is fixed to the rotating body and a free end that is not fixed to the rotating body, with each of the two separate parts having a cantilever form, and wherein the free end side of the second teeth comes into contact with the fixed end side of the first teeth in case that the regulation guide is at the first position and the fixed end side of the second teeth comes into contact with the free end side of the first teeth in case that the regulation member is at the second position.

18. The recording apparatus of claim 17, further comprising:

a first gap formed between a first separate part of the second teeth part and an inner part of the rotating body; and a second gap formed between a second separate part of the second teeth part and the inner part of the rotating body.

19. The recording apparatus of claim 17, wherein the first separate part and the second separate part are provided on opposite sides of a rotation axis.

* * * * *